United States Patent
Scarrott

[15] 3,694,678
[45] Sept. 26, 1972

[54] LINEAR MOTORS FOR HEAD ACTUATORS

[72] Inventor: Gordon George Scarrott, Welwyn Garden City, England

[73] Assignee: International Computers Limited, London, England

[22] Filed: Dec. 30, 1970

[21] Appl. No.: 102,772

[30] Foreign Application Priority Data
Jan. 28, 1970 Great Britain............4,053/70

[52] U.S. Cl..................................310/13, 310/27
[51] Int. Cl..........................................H02k 41/02
[58] Field of Search.........................310/12–14, 27, 310/25, 177; 179/115.5, 115.5 UC

[56] References Cited

UNITED STATES PATENTS

| | | | |
|---|---|---|---|
| 3,505,544 | 4/1970 | Helms | 310/13 |
| 2,906,899 | 9/1959 | Geneslay | 310/13 UX |
| 2,716,736 | 8/1955 | Rex | 336/177 X |
| 1,270,920 | 7/1918 | Botz | 310/27 UX |

FOREIGN PATENTS OR APPLICATIONS 789,725  1/1958  Great Britain...............310/27

*Primary Examiner*—D. F. Duggan
*Attorney*—Hane, Baxley & Spiecens

[57] ABSTRACT

A moving coil linear motor is described having an annular non-magnetic gap defined by an annular permanent magnet and a pair of pole pieces on the magnet, one pole piece having a circular aperture therethrough, the center of which is coaxial with the annular magnet. A hollow tubular coil is movably situated in the annular gap and coaxial therewith. One or both pole pieces have attached thereto a layer of material positioned in the annular gap, the material having a high electrical conductivity in a circumferential direction to provide a closed electrical path coaxial with the coil and having a high magnetic permeability in a radial direction. Composite material may be used in the form of alternate annular laminations of copper and iron.

2 Claims, 2 Drawing Figures

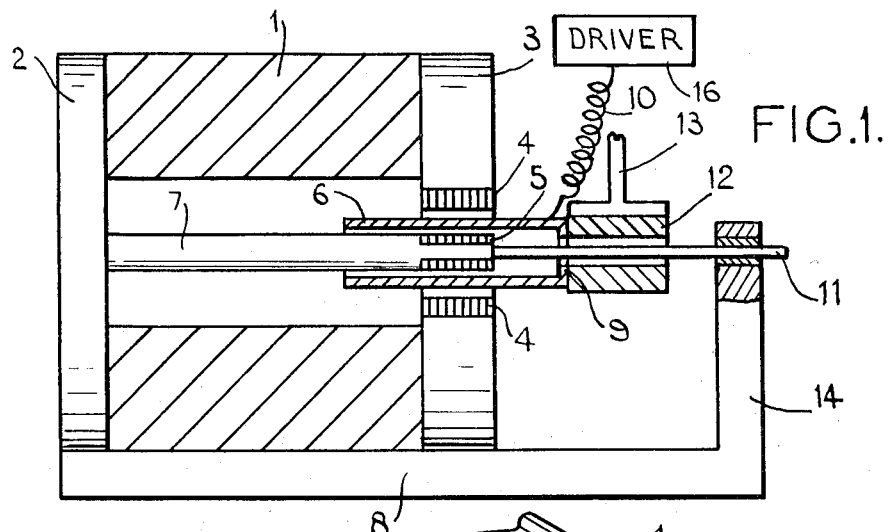
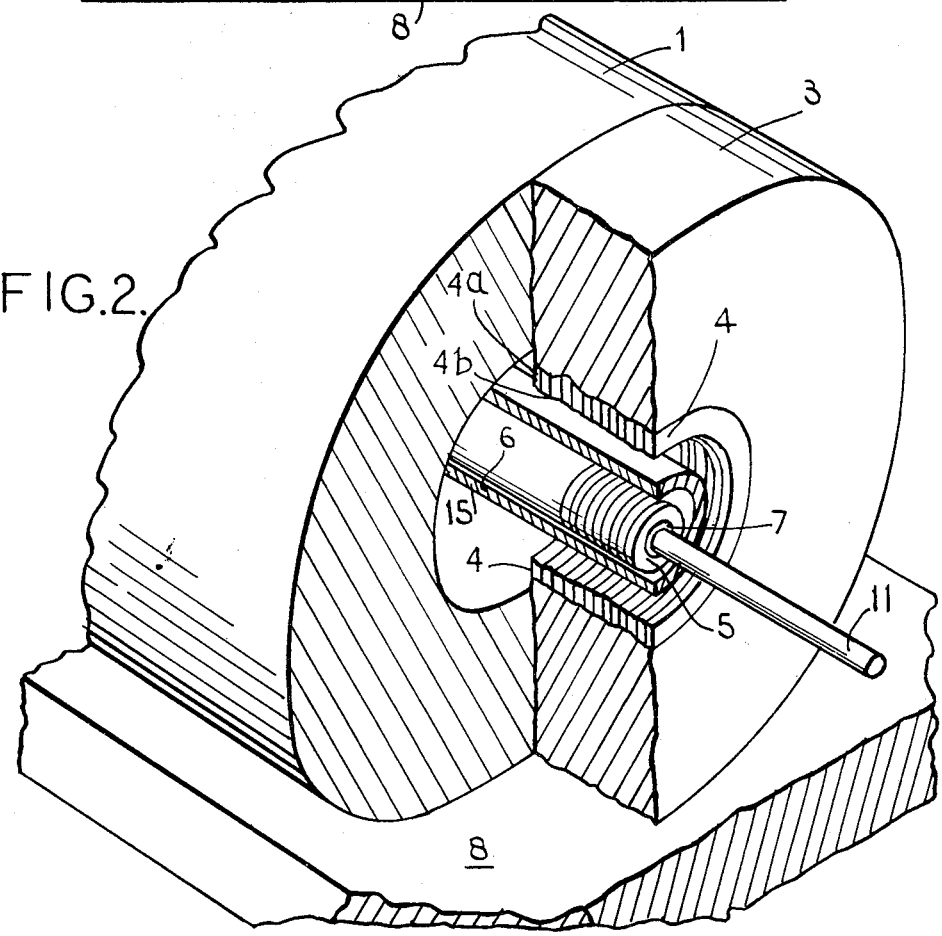

LINEAR MOTORS FOR HEAD ACTUATORS

BACKGROUND OF THE INVENTION

This invention relates to linear motors.

It has been previously known to use linear motors for a number of purposes, for example, the positioning of a magnetic data recording head on tracks of a magnetic disk. Such linear motors may incorporate an annular shaped permanent magnet that surrounds a movable coil, with the coil moving in response to an applied potential. In the design of such motors, however, certain problems have arisen.

A problem which is encounted in such linear motors is that heat is generated in the iron pole pieces of the permanent magnet by eddy currents being induced therein. The induced eddy currents represent a loss of input power, which along with the power necessary to move the coil, must be provided by an input power supply. Thus, if eddy current losses could be reduced, the required input power would also be reduced.

Another problem is that the inductance of the coil should be low in order to achieve good response times for the linear motor. It has been proposed to provide copper tubes concentric with the coil both in and out of the magnetic field across the pole pieces. The tubes, however, occupy space in the air gap and increase the effective air gap across the pole pieces.

SUMMARY OF THE INVENTION

According to the invention, a linear motor includes a permanent magnet; first and second pole pieces on the magnet defining an annular non-magnetic gap between the pole pieces; a movable coil mounted coaxially of the annular non-magnetic gap and being movable in a direction parallel to the axis; and a layer of material positioned in the annular non-magnetic gap having a high electrical conductivity in a circumferential direction to provide a closed electrical coaxial with the coil and having a high magnetic permeability in a radial direction.

BRIEF DESCRIPTION OF THE DRAWINGS

Apparatus embodying the present invention will now be described, by way of example with reference to the accompany drawing, in which, FIG. 1 is a diagrammatic view of a linear motor and an associated actuating mechanism, and FIG. 2 is a partial section of the linear motor shown in FIG. 1.

DESCRIPTION OF THE PREFERRED EMBODIMENT

Referring now to the drawing there is shown a linear motor, having an annular magnet 1 with a disk 2 mounted at one end of the magnet and an annular pole piece 3 having an aperture coaxial with the magnet mounted at the other end. The disk 2 carries a pole piece 7 of cylindrical cross-section mounted thereon and extending into the aperture in pole piece 3 to form an annular non-magnetic air gap. The pole piece 7 extends along the axis of the magnet to a point level with the external surface of pole piece 3. The disc 2 and pole pieces 3 and 7 are made of soft iron but it will be realized that any material which will provide a low reluctance path for the flux of magnet 1 may be used. The material used for the pole piece 7 may be the same as or different from the material used for pole piece 3 and the cross-sections of pole pieces 3 and 7 have dimensions suitable to obtain maximum flux in the annular air gap.

A ring 4 consisting of a layer of an iron-copper composite material is located in the non-magnetic air gap between pole pieces 3 and 7. The ring 4 is in the form of a plurality of annular laminations alternately of iron 4a and copper 4b, each lamination having a central aperture coaxial with the aperture in the pole piece 3. The assembly of alternate laminations 4a 4b is mounted in the aperture in the pole piece 3 with the peripheral edges of all the laminations in contact with the inside surface of the aperture in pole piece 3.

A further ring 5 of an iron-copper composite material is located in the non-magnetic air gap by fixing a stack of annular laminations alternately of iron and copper over the end portion of pole piece 7, which has a reduced cross-section, such that all the laminations are in contact with the pole piece.

The rings 4 and 5 of an iron-copper composite material may be formed in other ways than assembling a plurality of laminations alternately of iron and copper into a stack as described above. For example, annuli of suitable high-permeability Nickel-iron alloy may be plated on each face with copper, or copper annuli may be plated with the high-permeability iron alloy. The bimetallic annuli are then assembled in face-to-face relationship in order to form the rings 4 and 5 to be attached to the pole pieces 3 and 7 respectively. Alternately, the annuli may be formed by stamping from copper-iron bimetallic strip material.

A coil 6, the construction of which will be described later, having an end plate 9 is positioned to extend through the annular air gap between the rings 4 and 5.

Thus the magnet 1, disk 2 and pole piece 3 are supported on a base 8 which may take any convenient shape and has a portion 14 projecting at right-angles thereto. A rod 11 extends coaxially of the pole piece 7 from the end thereof and the other end of the rod 11 is supported by the portion 14 of the base 8.

End plate 9 is formed of plastics material but may be made of any rigid but preferably light-weight material formed into a disk shape with a central aperture and is free to slide along the rod 11 to guide the coil 6 for movement in an axial direction in the annular air gap. A cylindrical or tubular actuating member 12 is fixed to end plate 9 and an actuating rod 13 is attached to actuating member 12 in any convenient manner. Member 12 and rod 13 move with coil 6 in a direction parallel to rod 11 and are preferably formed from light but rigid materials.

Rod 13, for example, may be employed to support a magnetic read/write head (not shown) which is required to be moved from one information track to another on a magnetic recording medium such as a magnetic disk (not shown) in response to movement of the coil 6 axially of the magnet 1.

The coil 6 is formed of a strip of aluminum 15 helically wound on a removable former. Each turn of the strip 15 is insulated from adjacent turns by a thin film of insulating material which may be a layer of aluminum oxide on the strip surface. The coil assembly is impregnated with a resin bonding agent which is cured to form the coil 6 and the former is then removed. Flexible leads 10 are attached to the ends of the coil 6 and used to connect the coil 6 to the output of a suitable drive amplifier unit 16 which energizes the coil 6 with a current selected to produce the required axial movement of the coil 6.

The high electrical conductivity in a circumferential direction of the pole pieces 3 and 7 due to the copper laminations tends to reduce the inductance of that part of the coil 6 located in the annular air gap while the high magnetic permeability of these pole pieces due to the iron laminations effectively reduces the non-magnetic gap and hence maintains the flux density in the region of the gap.

Coils produced in this way are light in weight, substantially rigid and have a high electrical conductance. While it has been found that aluminum has a satisfactory conductance/density ratio, other materials may be employed. For example, if it is desired to increase the radial permeability of the coil 6, albeit at the expense of coil mass, the coil may be constructed from a copper-iron material, such as a bimetallic strip material similar to that described above for the production of the rings 4 and 5. Again, adjacent turns are insulated one from the next by the use of a suitable insulating material such as a catalyzed, unset epoxy resin. The flexible leads are attached to the ends of the bimetallic strip.

I claim:

1. A linear motor including a permanent magnet; first and second pole pieces on the magnet defining an annular non-magnetic gap between the pole pieces; a movable coil mounted coaxially with the annular non-magnetic gap and being movable in a direction parallel to the axis; and a plurality of annular layers formed from a stack of overlaid laminar annuli, the stack consisting of similar composite laminations each having an iron and a copper layer, positioned in and coaxially with the non-magnetic gap.

2. A linear motor as claimed in claim 1 in which said plurality of annular layers is positioned on one pole piece, further including a second similar plurality of annular layers positioned on the other pole piece, the layers of the two pole pieces being positioned to define said annular gap, and at least a portion of the coil lying within the gap so defined.

* * * * *